(12) United States Patent
Fasen

(10) Patent No.: US 7,924,520 B2
(45) Date of Patent: Apr. 12, 2011

(54) METHOD AND APPARATUS FOR DETERMINING POSITION OF A STORAGE MEDIUM

(75) Inventor: Donald J. Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 12/243,208

(22) Filed: Oct. 1, 2008

(65) Prior Publication Data

US 2010/0079905 A1  Apr. 1, 2010

(51) Int. Cl.
*G11B 20/10* (2006.01)

(52) U.S. Cl. ...................................... 360/39; 360/77.12

(58) Field of Classification Search .................... None
See application file for complete search history.

(56) References Cited

U.S. PATENT DOCUMENTS

| 5,432,652 | A  | * | 7/1995 | Comeaux et al. | 360/77.12 |
| 7,742,254 | B2 | * | 6/2010 | Cherubini et al. | 360/77.12 |
| 2009/0040651 | A1 | * | 2/2009 | Kudo et al. | 360/77.01 |

* cited by examiner

*Primary Examiner* — Jason C Olson

(57) ABSTRACT

A system and method for determining the value of a longitudinal position ("LPOS") bit of a storage medium. A system comprises a selector that selects a value for a longitudinal position ("LPOS") bit from a plurality of possible values derived from LPOS information read from a storage medium. A quality determiner that determines a quality value for each of a plurality of LPOS values derived from the LPOS information. The selection of the value for the LPOS bit is based, at least in part, on the quality values.

20 Claims, 3 Drawing Sheets

METHOD AND APPARATUS FOR DETERMINING POSITION OF A STORAGE MEDIUM

BACKGROUND

Magnetic storage devices are often included in computer systems to provide high capacity secondary storage or data archival. Magnetic tape systems are a type of magnetic storage. Magnetic tape systems are widely used because they provide high storage densities while employing low cost media.

A magnetic tape system generally comprises a recording medium, i.e., magnetic tape, and a medium access device known as a tape drive or tape transport that reads data from and writes data to the magnetic tape. A magnetic tape typically comprises a flexible narrow ribbon of a base material (e.g., polyester films such as polyethylene naphthalate or polyethylene tereohthalate), and a magnetic material, such as a metal particulate, affixed to the base material by a binding agent (e.g., vinyl chloride polymer). The tape drive accesses the magnetic tape as the tape passes over a set of transducers or sensor elements affixed to a head assembly. Write elements generate magnetic fields which encode data onto the tape as the tape passes over the head. Read elements sense the magnetic fields of the tape's magnetic material to read data from the tape.

Linear tape systems employ multiple data tracks that run parallel to one another over a length of the tape. Such tapes often include more data tracks than the tape drive has head elements. These systems use a serpentine recording method wherein a first set of data tracks is written as the tape moves across the head in a forward direction, and a second set of data tracks is written as the tape moves across the head in the reverse direction. Many direction reversals may be required to write a tape with hundreds or thousands of tracks.

The magnetic tape used in linear tape systems, for example the Linear Tape Open ("LTO") tape system, includes a servo track written onto the tape at manufacture. The tape heads are positioned to read and/or write the tape's data tracks by aligning the tape heads in accordance with the servo track. The servo track also contains encoded longitudinal position information used to determine the longitudinal position (i.e., the position along the length) of the tape relative to the tape head. Accurate determination of longitudinal tape position in the presence of tape defects and various other inhibitions to servo track access is desirable.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
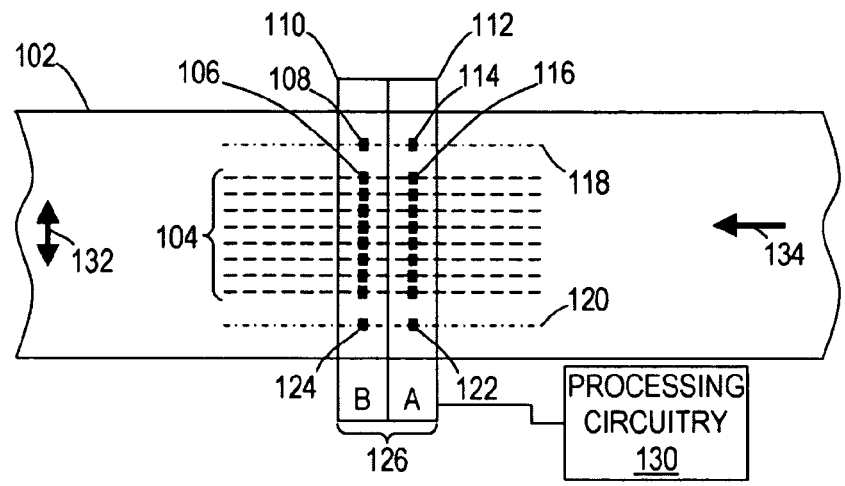
FIG. 1 shows a system that detects a servo track of a storage medium in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. For example, while generally described in terms of application to magnetic tape systems, those skilled in the art will understand that embodiments are applicable to a wide variety of storage systems using media comprising a track providing longitudinal position ("LPOS") information (e.g., magnetic disk, optical disk, or optical tape).

Some data storage systems, for example, magnetic tape systems compliant with the Linear Tape Open ("LTO") standard, employ storage media that includes one or more servo tracks written onto the media at manufacture. A medium access device, for example, an LTO tape drive, uses the pre-written servo tracks to align tape head read/write elements to the tape's data tracks. A servo track may also be encoded with LPOS data for determining the longitudinal location of the tape relative to the tape head. A tape drive or other media access device's ability to resolve the LPOS data embedded in a servo track is one limitation on the device's capacity to operate in the presence of medium defects and thermal asperities. Medium defects are flaws in the medium that produce undesirable reductions in medium performance. A thermal asperity is a read signal anomaly occurring when contact with medium asperities or contaminants produces an increase in read element temperature. Thermal asperities may cause a temporary loss of read capability in a head's read elements.

The LTO servo track format provides redundancy for each bit of an LPOS word. Two different bursts within each frame of a servo track define the same bit. To make effective use of this redundancy, embodiments of the present disclosure determine which of the two bursts to use when the bursts produce different LPOS bit values. Embodiments compute a quality measure of the LPOS bit value derived from each burst, and select the bit value exhibiting the highest quality to serve as the LPOS bit when the bit values are in conflict.

FIG. 1 shows a system that detects a servo track 118, 120 of a storage medium 102 in accordance with various embodiments. Here, the storage medium 102 is a magnetic tape. In this illustration, tape 102 includes two servo tracks 118, 120, and a plurality of data tracks 104. Other embodiments may include more or fewer servo tracks and/or data tracks. Head 126, as illustrated in FIG. 1, comprises a plurality of sensor elements 108, 114, 122, 124 for detecting a servo track 118, 120, and a plurality of sensor elements 106, 116 for accessing the data tracks 104. Other embodiments may include more or fewer servo track sensor elements and/or data track sensor elements. Head 126 comprises two "bumps" 110, 112, each comprising sensor elements. In one embodiment, one bump writes to tape and the other reads back the data to provide read-after-write verification. Other embodiments may include more or fewer bumps.

The servo tracks 118, 120 include LPOS information. As the servo tracks pass over the head 126, the sensor elements 108, 114, 124, 122, produce signals containing the encoded LPOS information. The signals are provided to the processing circuitry 130 which extracts the LPOS information and determines the tape's longitudinal position. Processing circuitry 130 includes circuitry for receiving signals from the servo track sensor elements 108, 114, 122, 124, and circuitry for determining longitudinal position.

Embodiments of tape 102 include redundant LPOS information. Processing circuitry 130 resolves the quality of each copy of LPOS information encoded in a servo track 118, 120 and selects the highest quality information as the LPOS output for that track. Further, in an embodiment including multiple servo tracks 118, 120, wherein each servo track encodes the same LPOS data, processing circuitry 130 may select the highest quality information across all servo tracks to provide as the LPOS output.

Figure 2:
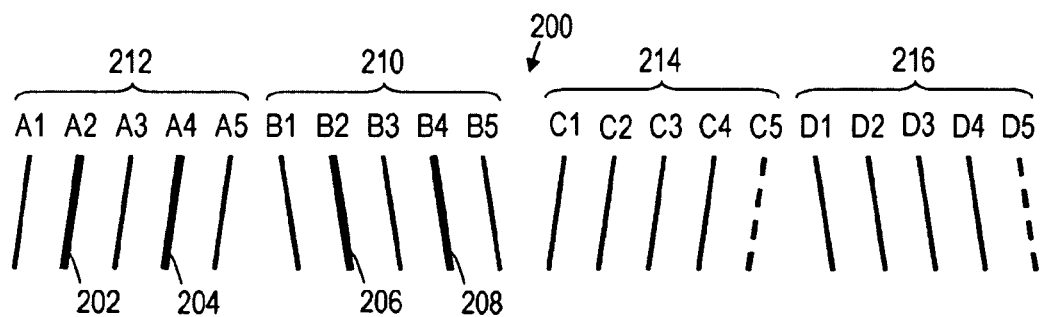
FIG. 2 shows a servo pattern for one frame of a servo track of a storage medium in accordance with various embodiments.

FIG. 2 shows a servo pattern for one frame 200 of a servo track 118, 120 of a storage medium 102 in accordance with various embodiments. Each servo track 118, 120, comprises a number of magnetic stripes (i.e., magnetized bands) arranged as shown. In some embodiments, the stripes are arranged in frames of 18 stripes in sets of five and four, wherein burst A 212 and burst B 210 each include 5 stripes and bursts C 214 and D 216 each include 4 stripes. The stripes of the servo bursts are used to define LPOS. In some embodiments, a frame 200 provides an LPOS bit, and 36 servo frames 200 provide a complete LPOS word. An LPOS word may be a number that is incremented over the length of the track 118, 120. A single error in any of the 36 LPOS bits will corrupt the entire LPOS word. If an excessive number of LPOS words are in error, writes to the medium 102 are discontinued until the LPOS words are restored. Such discontinuities reduce the total storage capacity of the medium 102.

An LPOS bit is encoded in each frame 200 by shifting the positions of stripes A2 202, A4 204, B2 206, and B4 208. A first shift is applied to stripes A2 202 and B2 206, and a second shift is applied to stripes A4 204 and B4 208. Because the same shifts are applied that are applied to burst A 212 are also applied to burst B 210, each frame provides two copies of an LPOS bit. Thus, LPOS redundancy is provided at the frame 200 level as well as at the track 118, 120 level. Embodiments make effective use of frame level redundancy by selecting a frame bit according to a quality measure generated for each of the A 212 and B 210 bursts.

An LPOS value is generated for each burst 212, 210 by accumulating the time differences between adjacent stripe pulse times. Considering the B burst 210 for example:

$$LPOS\_Value = (B2-B1) - (B3-B2) - (B4-B3) + (B5-B4). \quad (1)$$

LPOS_Value is compared against a zero value to determine if the LPOS bit is a "1" or a "0." If the A2 202 to A4 204 or the B2 206 to B4 208 time difference is greater than the nominal stripe pulse spacing, then LPOS_Value is negative and the LPOS bit is a "1." Conversely, if the A2 202 to A4 204 or the B2 206 to B4 208 time difference is smaller than the nominal stripe pulse spacing, LPOS_Value is positive and the LPOS bit is a "0." If, for example, an embodiment specifies a +/−0.25 um shift in the A and B burst 212, 210 stripes 2 202, 206 and 4 204, 208 to define a bit value, then applying equation (1) where B2 206 is shifted 0.25 um closer to B1 and B4 208 is shifted 0.25 um farther from B3 results in:

$$\begin{aligned} LPOS\_Value &= (B2-B1) - (B3-B2) - (B4-B3) + (B5-B4) \\ &= (-.25\,um) - (+.25\,um) - (+.25\,um) + (-.25\,um) \\ &= -1\,um \end{aligned}$$

Thus, these shifts encode a "1" bit. An LPOS bit value $A_B$ may be determined for the A burst 212 (LPOS_ValueA), a bit value $B_B$ for the B burst 210 (LPOS_ValueB), and a bit value $T_B$ from the total of the LPOS values, LPOS_ValueA+LPOS_ValueB.

Figure 3:
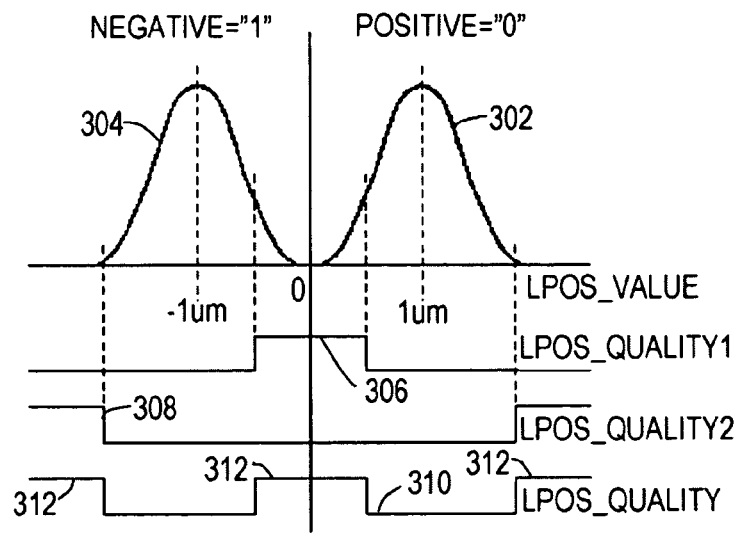
FIG. 3 shows a distribution of longitudinal position ("LPOS") values for bits derived from a servo track of a storage medium in accordance with various embodiments.

FIG. 3 shows an LPOS_Value distribution for "0" bits 302 and "1" bits 304 derived from a servo track 118, 120 of a storage medium 102 in accordance with various embodiments. Variations in LPOS_Value are due to read-back noise from the media 102, head 126, and processing circuitry 130. An extreme outlier from these distributions 302, 304 indicates that the bit is defective and should not be used. Outliers can occur between the distributions 302, 304, as illustrated by LPOS_Quality1 306, or outside the distributions as illustrated by LPOS_Quality2 308. Combining (e.g., "oring") quality comparators 306, 308 results in an overall LPOS quality indication, LPOS_Quality 310. Regions 312 of LPOS Quality 310, and corresponding regions of LPOS_Quality1 306 and LPOS_Quality2 308, indicate a poor quality LPOS_Value. Regions 312 may be determined, for example, by examining a range of LPOS_Values produced during system operation. Some embodiments use LPOS Quality standards 306, 308, 310 that are predetermined and stored in processing circuitry 130. Other embodiments compute LPOS Quality standards 306, 308, 310 during system operation. Embodiments may apply various combinations of LPOS_Quality1 306, LPOS_Quality2 308, or LPOS_Quality 310 to determine whether LPOS_Value is of sufficient quality to produce an LPOS bit.

Figure 4:
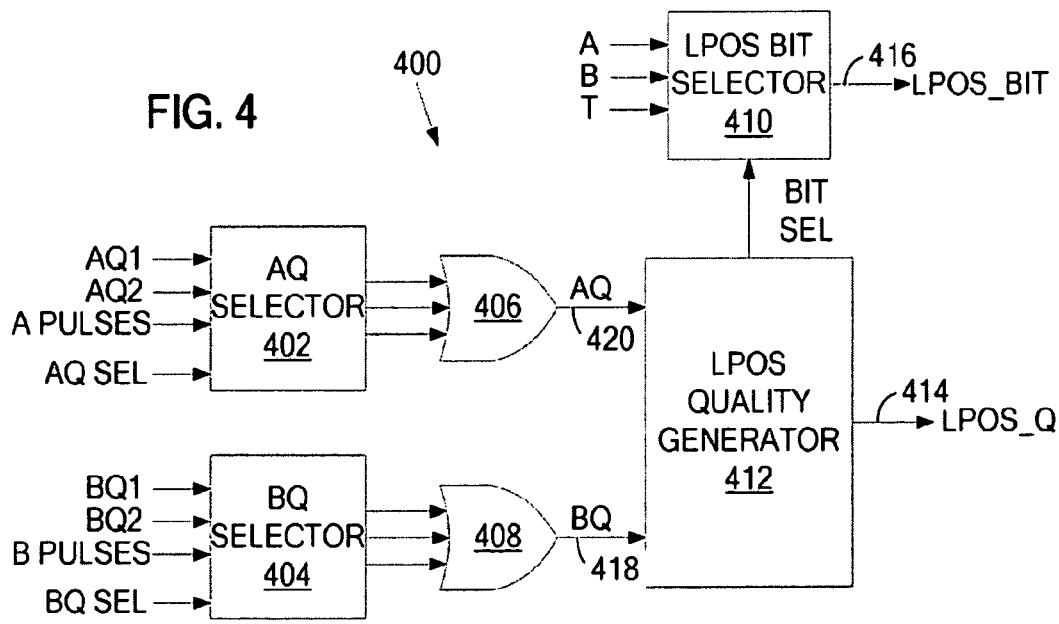
FIG. 4 shows a block diagram of a system that provides an LPOS bit and an LPOS quality value in accordance with various embodiments.

FIG. 4 shows a block diagram of a system 400, included in processing circuitry 130, that provides an LPOS bit and an LPOS quality value in accordance with various embodiments. The A burst quality selector (AQ Selector) 402 selects from A burst quality comparators AQ1 and AQ2, and A Pulses, the number of pulses (stripes) detected in an A burst 212 to provide quality indicators to subsequent circuit elements. Embodiments may select any combination of the quality indicators to use in LPOS_ValueA quality determination. AQ1 and AQ2 identify whether LPOS_ValueA falls within the quality regions defined by versions of LPOS_Quality1 306 and LPOS_Quality2 308, respectively, applicable to the A burst 212. The selected quality indicators are combined (e.g., "or'd") in element 406 to provide a composite LPOS_ValueA quality determination AQ 420. The BQ Selector 404 and element 408 provide equivalent functionality to generate composite LPOS_ValueB quality determination BQ 418.

The LPOS_ValueA and LPOS_ValueB composite quality determinations, AQ 420 and BQ 418, are provided to the LPOS Quality Generator 412. The LPOS Quality Generator combines AQ 420 and BQ 418 to provide selection control to LPOS Bit Selector 410. LPOS Bit Selector 410 selects one of $A_B$, $B_B$, and $T_B$, LPOS bit values derived from LPOS_ValueA and LPOS_ValueB, to serve as the LPOS_BIT 416. The LPOS_BIT 416 is shifted into an LPOS shift register (not shown) after each B burst 210, one bit per servo frame, to construct the LPOS word.

The LPOS Quality Generator 412 also provides an LPOS bit quality bit, LPOS_Q 414. Embodiments shift LPOS_Q 414 into a register (not shown) so that the quality of each LPOS bit, as well as a combination (e.g., the "or") of all the quality bits in the LPOS word can be used to determine whether individual LPOS bits, or the entire LPOS word is suspect. If the quality of either an individual LPOS bit or the entire LPOS word is determined to be questionable, then either the suspect bit or the entire LPOS word can be replaced with the corresponding bit or word derived from an alternate servo track 118, 120.

Some embodiments provide logic to generate the LPOS_BIT 416 and LPOS_Q 414 in accordance with Table 1 below, however, embodiments are not limited to any particular bit or quality determinations.

TABLE 1

| BQ | AQ | LPOS_Q | LPOS_BIT |
|----|----|--------|----------|
| 0 | 0 | 0 | $T_B$ |
| 0 | 1 | 1 | $B_B$ |
| 1 | 0 | 1 | $A_B$ |
| 1 | 1 | 1 | $T_B$ |

The various elements of system 400 may be implemented in a processor, such as a general/special purpose digital signal processor circuit, a microcontroller, or microprocessor and associated software programming, or in other circuitry adapted to perform the operations described above or their equivalents. Processor instructions comprising software programming can be stored in a memory device coupled to the processor.

The term processor as used herein generally refers to a computer central processing unit ("CPU"), embodiments of which comprise a control unit that fetches, decodes, and executes instructions, an arithmetic and logic unit ("ALU") that performs logical and mathematical operations, registers for storage of values used in processor operation, and various other logic. Some embodiments of a processor comprise volatile memory and/or non-volatile memory for storage of data and instructions. Some processor embodiments include circuitry configured to perform only certain specific computations or operations. Thus, one embodiment of a processor includes circuitry specifically designed to perform the operations described herein.

Figure 5:
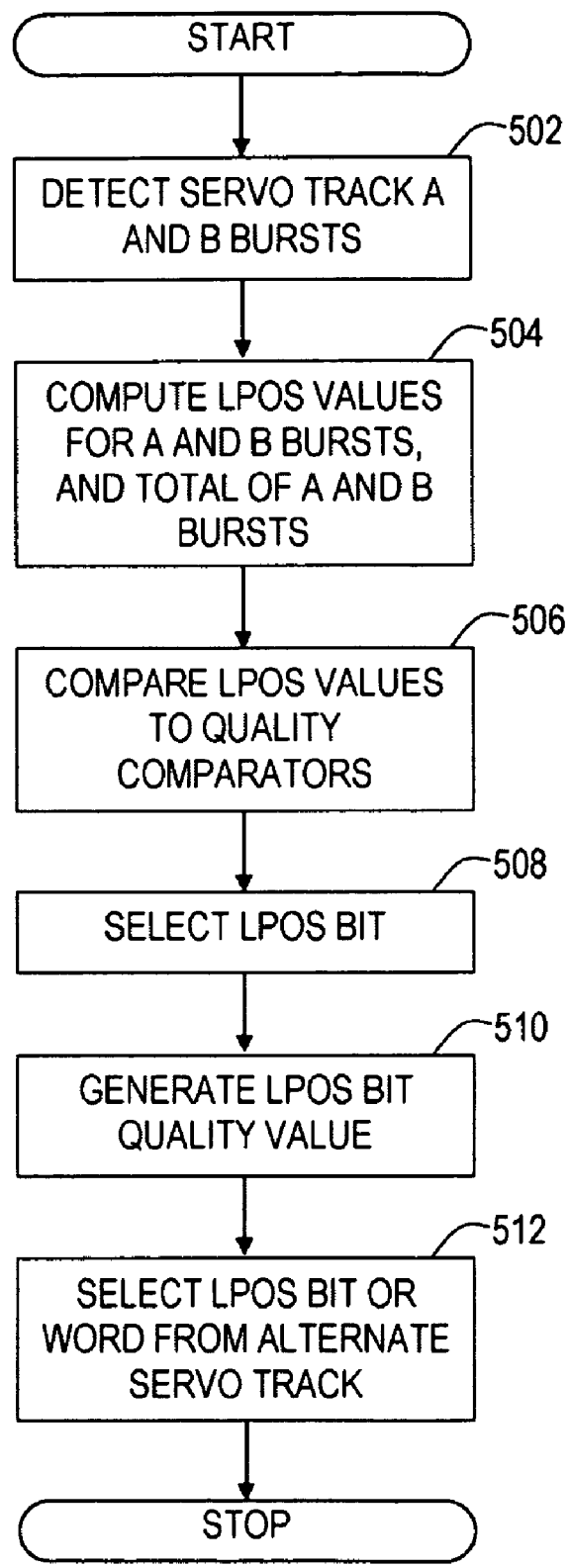
FIG. 5 shows a flow diagram for a method for providing an LPOS bit in accordance with various embodiments.

FIG. 5 shows a flow diagram for a method for generating an LPOS bit in accordance with various embodiments. Though depicted sequentially as a matter of convenience, at least some of the actions shown can be performed in a different order and/or performed in parallel. Additionally, some embodiments may perform only some of the actions shown. In block 502, the tape 102 is moving over the head 126, and the servo track sensor elements 114, 108 are detecting the servo track signal 118 written onto the tape 102 when the tape 102 was manufactured. The A burst 212 and the B burst 210 of the servo track 118 are detected. The bursts 210, 212 are encoded with identical LPOS information.

In block 504, LPOS values LPOS_ValueA and LPOS_ValueB are computed for the A burst 212 and the B burst 210. Additionally, some embodiments compute a total LPOS value as the sum of LPOS_ValueA and LPOS_ValueB. Embodiments determine an LPOS bit value based on these LPOS values.

LPOS_ValueA and LPOS_ValueB are compared to a set of quality thresholds 306, 308, 310 in block 506. The quality thresholds 306, 308, 310 are based on expected and/or measured distributions of LPOS values for "0" and "1" LPOS bits values. The quality thresholds 306, 308, 310 may be predetermined or determined during system operation. Some embodiments consider the number of pulses (stripes) detected in each burst 210, 212 as an additional quality measure. Based on the aforementioned quality determinants, embodiments select an LPOS value falling within a range of acceptable LPOS values to define an LPOS bit in block 508. By selecting an LPOS bit based on LPOS value quality measures, embodiments determine which LPOS_Value derived from the redundant LPOS information encoded in the A and B bursts 212, 210 of a servo track is most probably correct when LPOS_ValueA and LPOS_ValueB are indicative of different LPOS bit values.

In block 510, an overall LPOS bit quality value is generated. The LPOS bit quality value is used to determine whether the quality of an LPOS bit is suspect. If the LPOS bit quality value indicates that an LPOS bit is of questionable quality, then the suspect LPOS bit, or the entire LPOS word, comprising 36 LPOS bits, may be replaced with the corresponding bit or word from an alternate servo track in block 512. In some embodiments the LPOS bit quality value (LPOS_Q) is a single bit, as shown in Table 1 above.

The above discussion is meant to be illustrative of the principles and various embodiments of the present invention. Numerous variations and modifications will become apparent to those skilled in the art once the above disclosure is fully appreciated. For example, while embodiments have been described in relation to LTO tape systems, one of skill in the art will recognize that the principals disclosed herein are applicable to other systems employing redundant longitudinal positional information written onto a storage medium. It is intended that the following claims be interpreted to embrace all such variations and modifications.

What is claimed is:

1. A system, comprising:
a selector that selects a value for a position bit from a plurality of possible values for the position bit derived from position information read from a storage medium; and
a quality determiner that determines a quality value for each of a plurality of position values derived from the position information;
wherein selection of the value for the position bit is based, at least in part, on the quality values.

2. The system of claim 1, wherein the position bit is a longitudinal position bit and the position value is a longitudinal position value.

3. The system of claim 1, wherein the plurality of position values comprises a first burst position value, a second burst position value, and a combination of the first burst position value and the second burst position value.

4. The system of claim 3, wherein:
- selection of the value of the position bit is based, at least in part, on a first burst position value if a first burst position quality value is within a predetermined range of values and a second burst position quality value is outside a predetermined range of values;
- selection of the value of the position bit is based, at least in part, on the second burst position value if the second burst position quality value is within a predetermined range of values and the first burst position quality value is outside a predetermined range of values; and
- selection of the value of the position bit is based, at least in part, on the combination of the first burst position value and the second burst position value if the first burst position quality value and the second burst position quality value are within a predetermined range of values or the first burst position quality value and the second burst position quality value are outside a predetermined range of values.

5. The system of claim 1, further comprising a position quality generator that combines the quality values for the plurality of position values to provide a quality value for the selected position bit value.

6. The system of claim 1, wherein a position bit is selected from a position bit produced for each of a plurality of servo tracks, the position bit is selected based, at least in part, on a position quality value determined for each position bit.

7. The system of claim 1, wherein the quality determiner determines the quality value for each position value by comparing each position value to a predetermined quality standard based on a distribution of position values.

8. The system of claim 1, wherein the quality determiner computes a quality standard for comparing with each position value by examining a distribution of the position values produced during operation of the system.

9. A method, comprising
- determining a quality value for each of a plurality of redundant position values derived from a servo track of a storage medium; and
- selecting a value for a position bit from a plurality of redundant position bit values derived from the servo track, the selecting based, at least in part, on the position value quality values.

10. The method of claim 9, further comprising combining a quality standard for a position value and a pulse count for a burst encoding a position bit to produce a position value quality value.

11. The method of claim 9, further comprising selecting the value for the position bit based on a plurality of position values comprising a first burst position value, a second burst position value, and a combination of the first burst position value and the second burst position value.

12. The method of claim 9, further comprising combining the quality values determined for each of the plurality of position values to produce a position bit quality value indicative of the quality of the value selected for the position bit.

13. The method of claim 9, further comprising selecting a position bit from a position bit produced for each of a plurality of servo tracks, the position bit is selected based, at least in part, on a position bit quality value determined for each position bit.

14. The method of claim 9, wherein determining the quality value comprises comparing each position value to a predetermined quality standard based on a distribution of position values.

15. The method of claim 9, further comprising computing a quality standard for comparing with each position value by examining a distribution of the position values derived from the servo track.

16. A tape drive, comprising:
- means for determining a quality value for each of a plurality of redundant position values derived from a servo track of a tape; and
- means for selecting a value for a position bit from a plurality of redundant position bit values derived from the servo track, the selecting based, at least in part, on the quality value determined for each of the redundant position values.

17. The tape drive of claim 16, further comprising means for combining a quality standard for each position value and a pulse count for each burst encoding a position bit to produce the quality value for each position value.

18. The tape drive of claim 16, further comprising means for combining the quality values assigned to each redundant position value to produce a position bit quality value that indicates the quality of the selected position bit.

19. The tape drive of claim 16, further comprising means for selecting a position bit from a position bit produced for each of a plurality of servo tracks, the position bit is selected based, at least in part, on a position bit quality value determined for a position bit.

20. The tape drive of claim 16, wherein the means for determining comprises means for comparing each position value to a predetermined quality standard based on a distribution of position values.

* * * * *

UNITED STATES PATENT AND TRADEMARK OFFICE
CERTIFICATE OF CORRECTION

| | | |
|---|---|---|
| PATENT NO. | : 7,924,520 B2 | Page 1 of 1 |
| APPLICATION NO. | : 12/243208 | |
| DATED | : April 12, 2011 | |
| INVENTOR(S) | : Donald J. Fasen | |

It is certified that error appears in the above-identified patent and that said Letters Patent is hereby corrected as shown below:

In column 1, line 4, above "BACKGROUND" insert
-- CROSS REFERENCE TO RELATED APPLICATIONS
This Application claims the benefit of provisional patent application serial number 61/082,246, filed Jul. 21, 2009, titled "Method and Apparatus for Determining Position of a Storage Medium" which application is incorporated by reference herein as if reproduced in full below. --.

Signed and Sealed this
Thirteenth Day of September, 2011

David J. Kappos
*Director of the United States Patent and Trademark Office*